United States Patent
Okamoto (10) Patent No.: US 8,193,671 B2
(45) Date of Patent: Jun. 5, 2012

(54) ELECTRIC MOTOR

(75) Inventor: Tetsuo Okamoto, Ehime (JP)

(73) Assignee: Koueidenshi Corporation, Tokyo (JP)

( * ) Notice: Subject to any disclaimer, the term of this patent is extended or adjusted under 35 U.S.C. 154(b) by 0 days.

(21) Appl. No.: 13/145,559

(22) PCT Filed: May 7, 2009

(86) PCT No.: PCT/JP2009/002010
§ 371 (c)(1), (2), (4) Date: Jul. 20, 2011

(87) PCT Pub. No.: WO2010/084530
PCT Pub. Date: Jul. 29, 2010

(65) Prior Publication Data
US 2011/0273046 A1    Nov. 10, 2011

(30) Foreign Application Priority Data
Jan. 20, 2009  (JP) ................. 2009-009478

(51) Int. Cl.
*H02K 1/27* (2006.01)
*H02K 21/24* (2006.01)

(52) U.S. Cl. ............... 310/154.06; 310/154.25; 310/268

(58) Field of Classification Search ............ 310/154.45, 310/154.05, 154.06, 154.23, 154.25, 154.32, 310/154.33, 198, 268, 165.36, 156.82
See application file for complete search history.

(56) References Cited

U.S. PATENT DOCUMENTS

| 7,939,983 B2 * | 5/2011 | Okamoto | 310/178 |
| 2004/0135452 A1 * | 7/2004 | Tu et al. | 310/156.32 |

FOREIGN PATENT DOCUMENTS

| JP | 33-005011 B | 3/1958 |
| JP | 33-001961 B | 7/1958 |
| JP | 05-236719 A | 9/1993 |
| JP | 2004-282855 A | 10/2004 |
| JP | 3783141 B2 | 6/2006 |
| JP | 2006-238623 A | 9/2006 |
| JP | 4085128 B1 | 5/2008 |

* cited by examiner

*Primary Examiner* — Quyen Leung
*Assistant Examiner* — Leda Pham
(74) *Attorney, Agent, or Firm* — Rabin & Berdo, P.C.

(57) ABSTRACT

Provided is an electric motor which is simple to design and manufacture, and can be operated by a small current. The electric motor is comprised of a stator 55 having a first disk 45 and a second disk 50, a first ring core 10 having a first switching winding 15 divided into a winding part and a gap part, a second ring core 12 having a second switching winding 20 divided into a winding part and a gap part, and a first rotor 35 having a third disk 25 and a second rotor 40 having a fourth disk 30 mutually connected by a driving shaft 60. The first and second switching windings 15, 20 include first and second power supplies 125-1, -2, and first and second switches 75-1, -2, respectively.

2 Claims, 9 Drawing Sheets

ELECTRIC MOTOR

TECHNICAL FIELD

The present invention relates to an electric motor in which both a rotor and a stator comprise permanent magnet pieces. More specifically, the present invention relates to an electric motor which controls the attraction and repellent between a rotor and a stator by switching windings disposed between the rotor and the stator and obtains rotational force.

BACKGROUND ART

Patent Document 1 describes a synchronous electric motor comprising a stator comprising a cylindrical magnetic core on which concyclic magnetic poles are provided with a conformal spacing, a non-ferrous metal collar for shading surrounding only one pole of these pairs of magnetic poles and a coil to be connected to a single phase AC source, and a rotor comprising an arbitrary number of turnable small permanent magnets made of sinter material small void away from the magnetic pole group of the stator.

Figure 8:
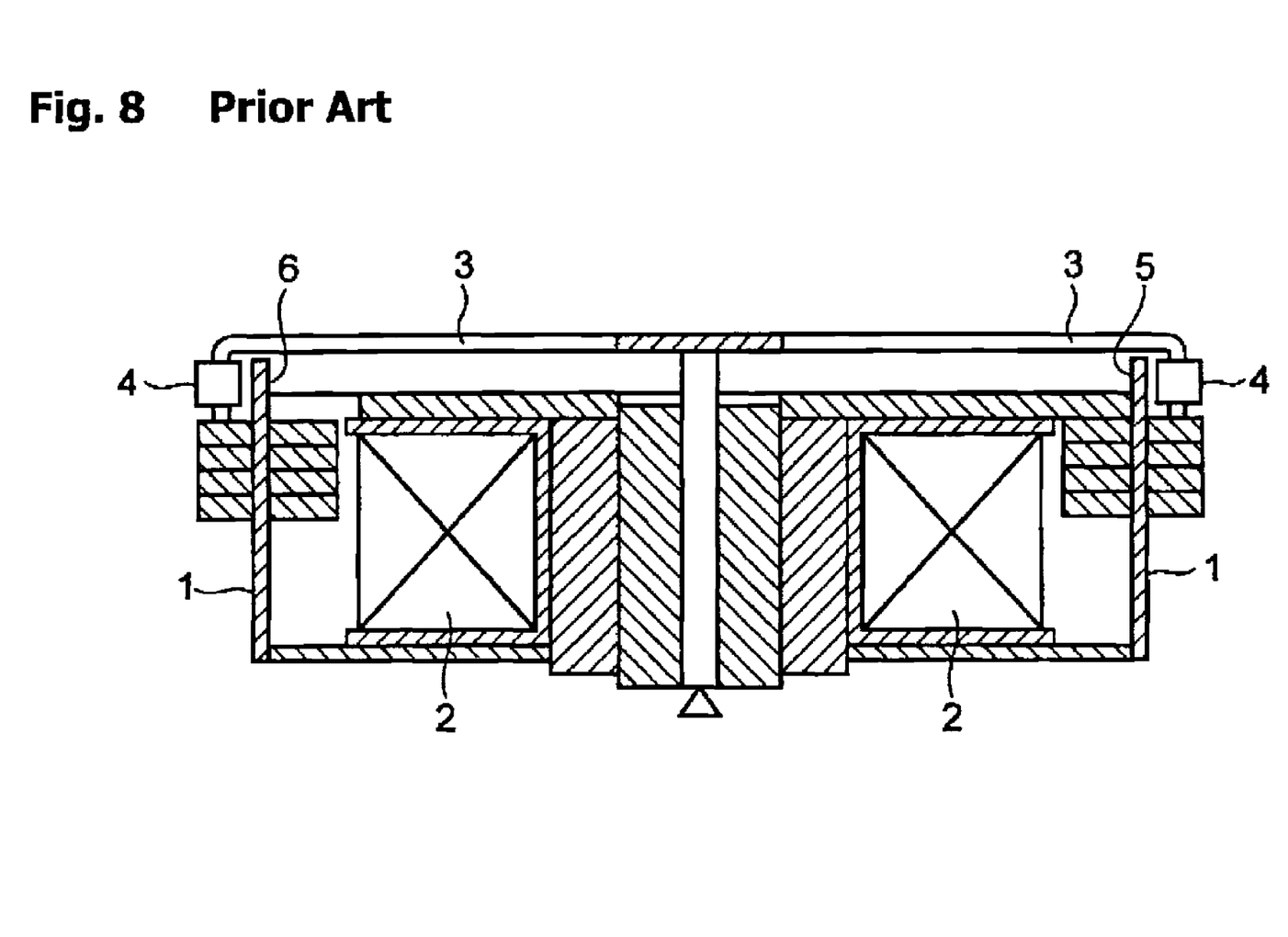
FIG. 8 is a longitudinal section diagram of a synchronous electric motor of the patent document 1.

FIG. 8 is a longitudinal section diagram of the synchronous electric motor of the Patent Document 1. In FIG. 8, when single phase AC is applied to the coil 2, the magnetic polarity of upper ends 5 and 6 of the cylindrical magnetic core 1 is sequentially moves. In this time, the small magnets 4 disposed on small shaft on the edge of a radial arm 3 of the rotor slightly turns according to the magnetic attraction and repulsion between nearest magnetic poles 5 and 6 on the stator side, and then starts to move to a predetermined direction prescribed by the rotor side fairly smoothly. After that, the small magnets 4 can connect rotation as long as current is applied to the coil 2. In other words, in the present motor, at the same time current is applied to a coil 3 at start, the small magnets 4 slightly turn around the small shaft and take the most appropriate position to receive rotational force, which constitutes an initiation. The small magnets 4 have a relationship as if the moon revolves around the earth.

Patent Document 2 describes a synchronous electric motor in which the rotor of a induction electric motor A and the rotor of a synchronous electric motor B are disposed on the same driving shaft, and the induction electric motor A mainly activates the driving shaft and continues rotation, and the synchronous electric motor B is powered by an output of a constant frequency of a vacuum tube circuit and compensates the driving shaft to rotate at a constant speed. In the synchronous electric motor B, the rotor is magnetized in such a manner that the same poles appear on the all periphery face or pole face facing the magnetic poles of a stator side, exciting coils are respectively wound around the magnetic poles of the stator side alternately in different wound direction and are connected to predetermined frequency power sources in series, and another magnetic passes reach to the rotor from yokes of the stator side are divided by nonmagnetic bodies.

Figure 9:
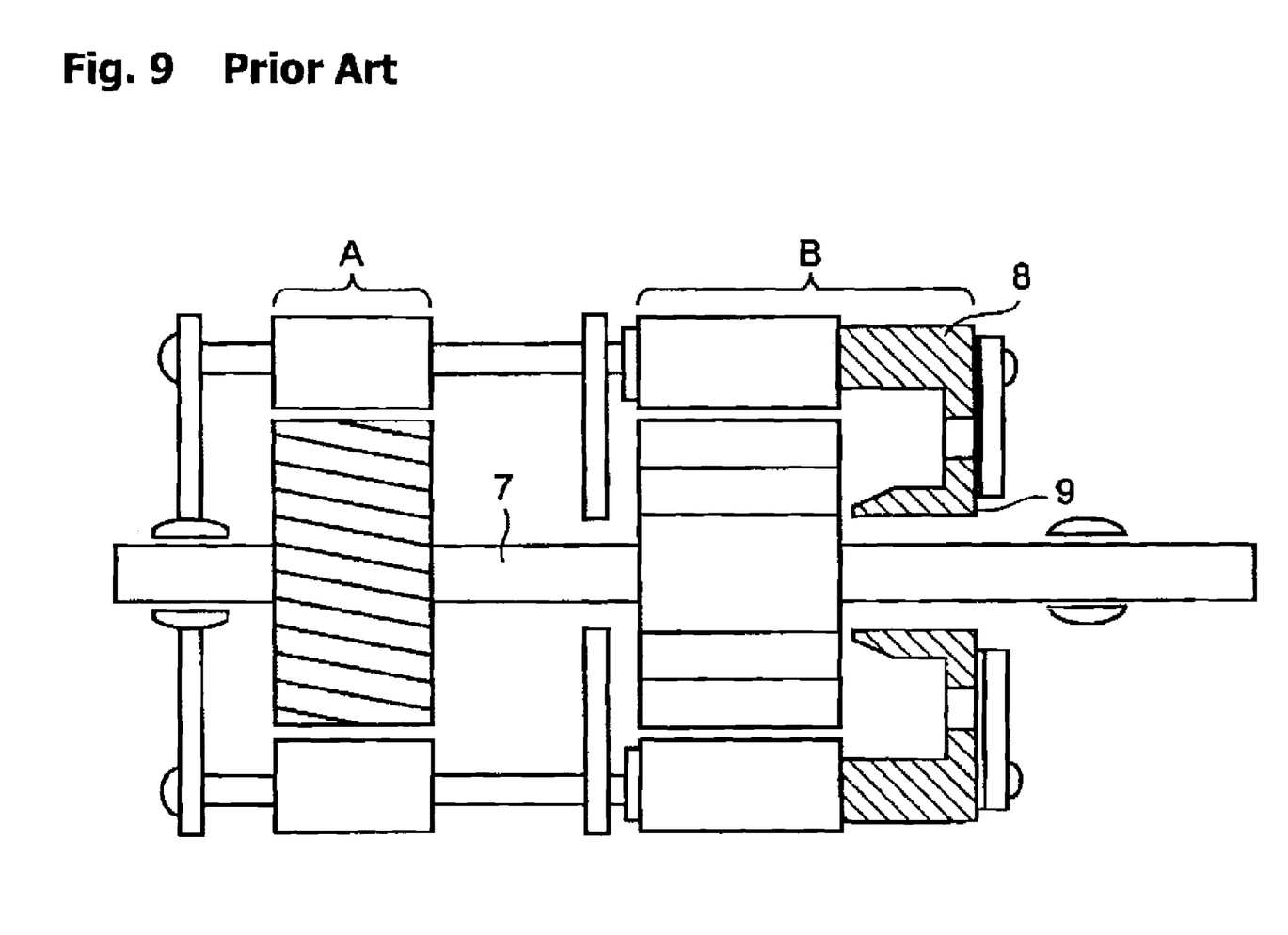
FIG. 9 is a partial longitudinal section diagram showing the internal structure of a synchronous electric motor of the Patent Document 2.

FIG. 9 is a partial longitudinal section diagram showing the internal constitution of the synchronous electric motor of the Patent Document 2. In FIG. 9, the rotor of the synchronous electric motor B is entirely North pole or South pole on all around face, also a yoke is divided into internal and external two parts, 8 and 9, and the magnetic pass resistance between them is set at a very high adjustable value. Therefore, at start, under a very low resistance, the small induction electric motor A is good enough, and also to reach a speed close to a predetermined rotational speed, the motor never receives strong resistance from an electric generation operation.

In short, according to the invention, by the small inductive electric motor A, the driving shaft 7 at near (+) (−) of a predetermined rotation speed defined by the frequency of the output obtained from the vacuum tube circuit is started easily and entered into a normal rotation state. Also, only a compensation operation to maintain the driving shaft 7 at a predetermined rotation speed should be controlled by the synchronous electric motor B by the output obtained from the vacuum tube circuit. Consequently, electricity required for the electric motor B may be small, and the whole apparatus can be designed very easily and manufactured at a lower cost.

As just described, the synchronous electric motor of the invention of the Patent Document 1 comprises the stator comprises the coil to be connected with the single phase AC power supply and the rotor comprises small permanent magnets.

The synchronous electric motor of the Patent Document 2 comprises the general format inductive electric motor A comprises the stator includes the exciting coils receive commercial AC and a basket-shaped rotor, the synchronous electric motor B comprises the stator includes exciting coils a~h and the magnetized rotor made of a hard paste material.

In either constitution, a stator is disposed concentrically covering the permanent magnets of a rotor, and rotation force is obtained by applying current to an exciting coil and generating a rotation magnetic field. To obtain this rotation force, sufficiently-large amounts of current are required, for obtaining a required torque. Also, to dispose a stator and rotor concentrically, it is required to maintain the gap between the stator and rotor with accuracy, and advanced design and production technologies are required.

[Patent Document 1] Japanese Examined Patent Publication No. 33-5011
[Patent Document 2] Japanese Examined Patent Publication No. 33-1961

DISCLOSURE OF THE INVENTION

Problems to be Solved by the Invention

The present invention has been made to solve such problems and an object of the present invention is to provide an electric motor which is easily designed and produced, and can operate with a small current.

Means for Solving the Problems

According to an aspect of the present invention, there is provided an electric motor including a stator plate having a plurality of permanent magnet pieces on a first surface thereof to form a first disk and a same number of permanent magnet pieces on a second surface thereof to form a second disk, and the first disk and the second disk may be constructed in such a manner that two magnet pieces adjacent with each other are aligned to have opposite magnetic poles. The first disk and the second disk may face with each other in such a manner that two corresponding magnet pieces are faced with each other to have opposite magnetic poles.

Optionally, a first ring core having a first switching winding may be disposed and fixed on a side of the first disk and the first switching winding may be dividedly wound around the first ring core to form a plurality of winding sections and a same number of gap sections.

Optionally, a second ring core having a second switching winding may be disposed and fixed on a side of the second disk and the second switching winding may be dividedly wound around the second ring core to form a plurality of winding sections and a same number of gap sections.

Further optionally, the numbers of the winding sections and the gap sections may be the same as the number of the permanent magnet pieces on the first disk or the second disk.

The electric motor of the present invention may also include a first rotor plate having the same number of permanent magnet pieces as that of the first disk on one surface thereof to form a third disk in such a manner that two magnet pieces adjacent with each other are aligned to have opposite magnetic poles and rotatably facing relative to the first switching winding, and a second rotor plate having the same number of permanent magnet pieces as that of the first rotor plate on one surface thereof to form a fourth disk in such a manner that two magnet pieces adjacent with each other are aligned to have opposite magnetic poles and rotatably facing relative to the second switching winding.

Optionally, the first rotor plate and the second rotor plate may be securely coupled by a driving shaft and the third disk and the fourth disk may face with each other in such a manner that two corresponding magnet pieces are faced with each other to have same magnetic poles.

The electric motor of the present invention may further include a first power supply means for intermittently supplying current through a first switch to the first switching winding and a second power supply means for intermittently supplying current through a second switch to the second switching winding.

Further optionally, the first power supply means may supply current to the first switching winding and the second power supply means may stop current to the second switching winding when the third disk rotatably faces relative to the first disk in such a manner that two corresponding magnet pieces are faced with each other to have same magnetic poles, and the second power supply means may supply current to the second switching winding and the first power supply means may stop current to the first switching winding when the fourth disk rotatably faces relative to the second disk in such a manner that two corresponding magnet pieces are faced with each other to have same magnetic poles, thereby controlling rotation of the first rotor plate and the second rotor plate.

Furthermore, the first switching winding may be wound in such a manner that each center of the winding sections is aligned with each of contact parts at which the magnet pieces of the first disk are in contact with each other, and the second switching winding may be wound in such a manner that each center of the winding sections is aligned with each of contact parts at which the magnet pieces of the second disk are in contact with each other.

Advantageous Effect of the Invention

According to the electric motor of the present invention, since the magnitude of a rotational torque is determined by a magnetic field strength, an electric motor needs less electricity. Additionally, no advanced design and fabrication technology is required because a stator and rotors can be easily arranged on the same driving shaft at predetermined spacings. Thus, there can be provided a simple electric motor which can operate with small electricity.

MODES FOR CARRYING OUT THE INVENTION

Figure 1:
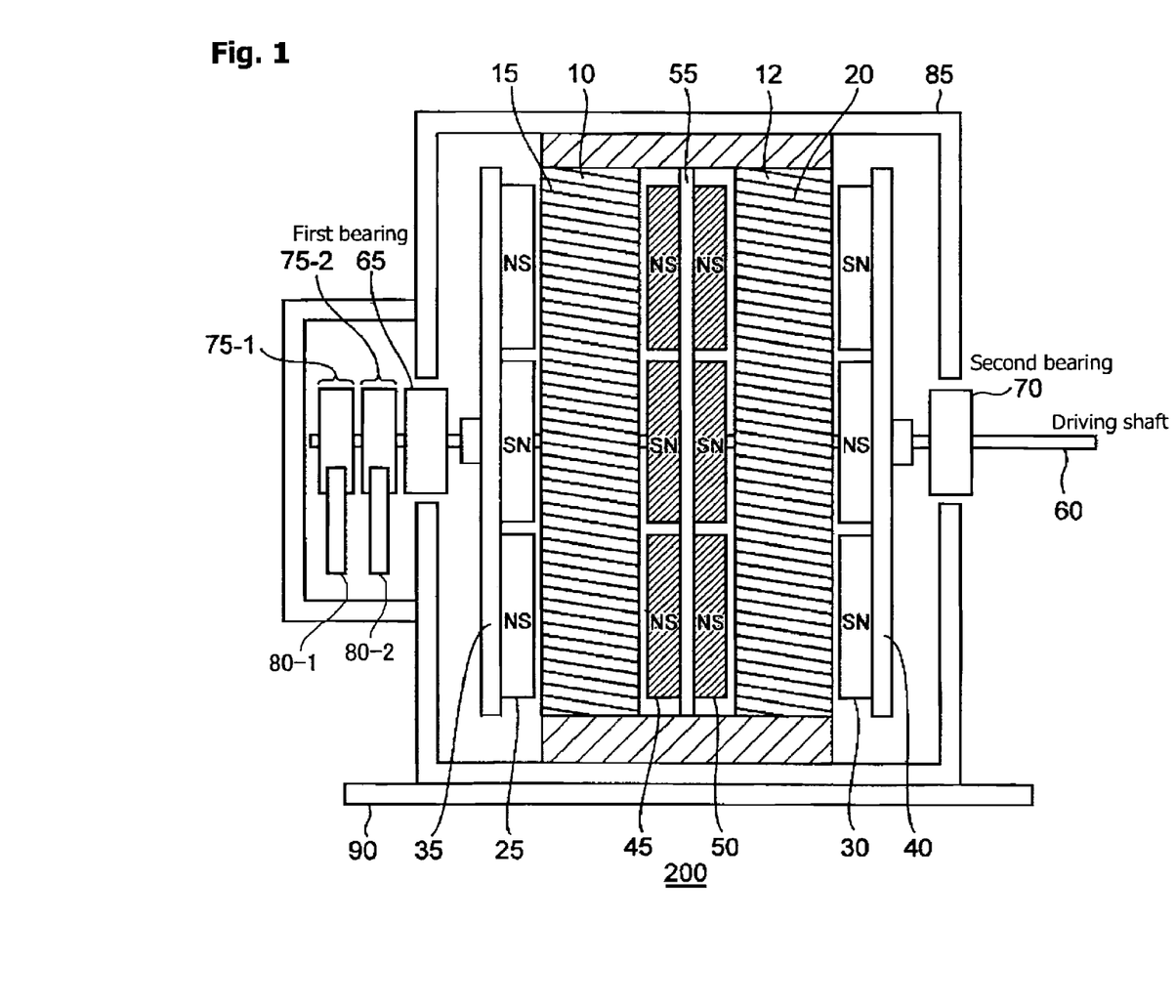
FIG. 1 is a constitutional diagram showing the constitution of an electric motor of the present invention.

An embodiment of the present invention will be described with reference to the drawings. FIG. 1 is a constitutional diagram showing an electric motor of the present invention. In FIG. 1, an electric motor 200 comprises a stator plate 55 having four magnet pieces on a first surface thereof to form a first disk 45 and a same number of magnet pieces on a second surface thereof to form a second disk 50, and the first disk and the second disk face with each other in such a manner that two corresponding magnet pieces are faced with each other to have opposite magnetic poles.

The electric motor 200 also comprises a first switching winding 15 wound around a first ring core 10 provided and fixed on the side of the first disk 45; a winding part and a gag part thereof being divided into four sections respectively, and a second switching winding 20 wound around a second ring core 12 provided and fixed on the side of the second disk 50; a winding part and a gap part thereof being divided into four sections respectively.

The electric motor also comprises a first rotor 35 facing the first ring core 10 and comprising a third disk 25 having four magnet pieces, and a second rotor 40 facing the second ring core 12 and comprising a fourth disk 30 having four magnet pieces, which are coupled to each other by a driving shaft 60. The third disk 25 and the fourth disk 30 face with each other in such a manner that two corresponding magnet pieces are faced with each other to have same magnetic poles. There is shown the case where the number of the magnet pieces on each disk is four. The number may be an arbitrary number more than one as long as they are the same number.

The stator 55, the first ring core 10 and the second ring core 12 are fixed on a base 90 by a stator cover 85. The driving shaft 60 is supported by bearings 65 and 70, and fixed on the base 90 by the stator cover 85. A first switch 75-1 connected to the first switching winding 15 and a second switch 75-2 connected to the second switching winding 20 are fixed to the driving shaft 60, respectively and also connected to power supplies 125-1 and 125-2, respectively through brushes 80-1 and 80-2. The rotational operation of the rotors 35 and 40 and the switch operation of the switches 75-1 and 75-2 are synchronized. Next, the detailed constitution of the electric motor 200 is explained.

Figure 2:
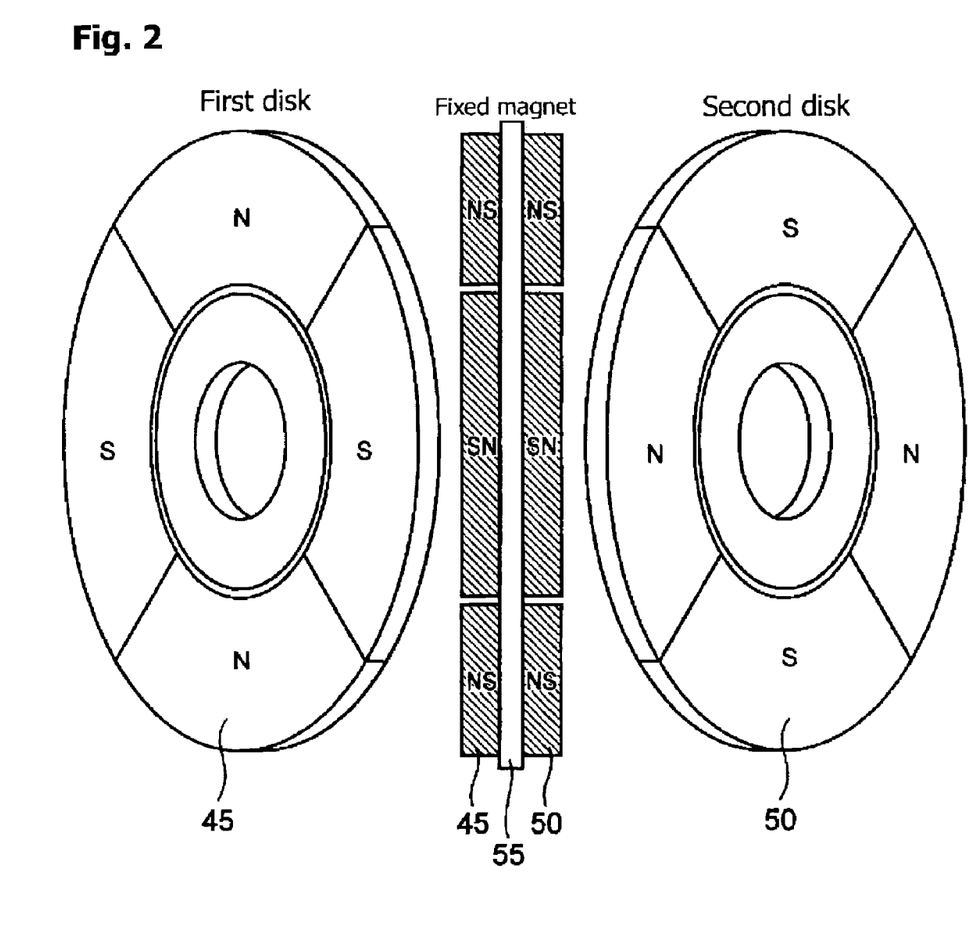
FIG. 2 is a stator constitutional diagram showing the constitution of a stator of the present invention.

FIG. 2 is a stator constitutional diagram showing the constitution of a stator of the present invention. The stator 55 has four magnet pieces on the first surface thereof to form the first disk 45 and a same number of magnet pieces on the second surface thereof to form the second disk 50, and the first disk and the second disk face with each other in such a manner that two corresponding magnet pieces are faced with each other to have opposite magnetic poles. The stator 55 is fixed on the base 90 by the stator cover 85.

Figure 3:
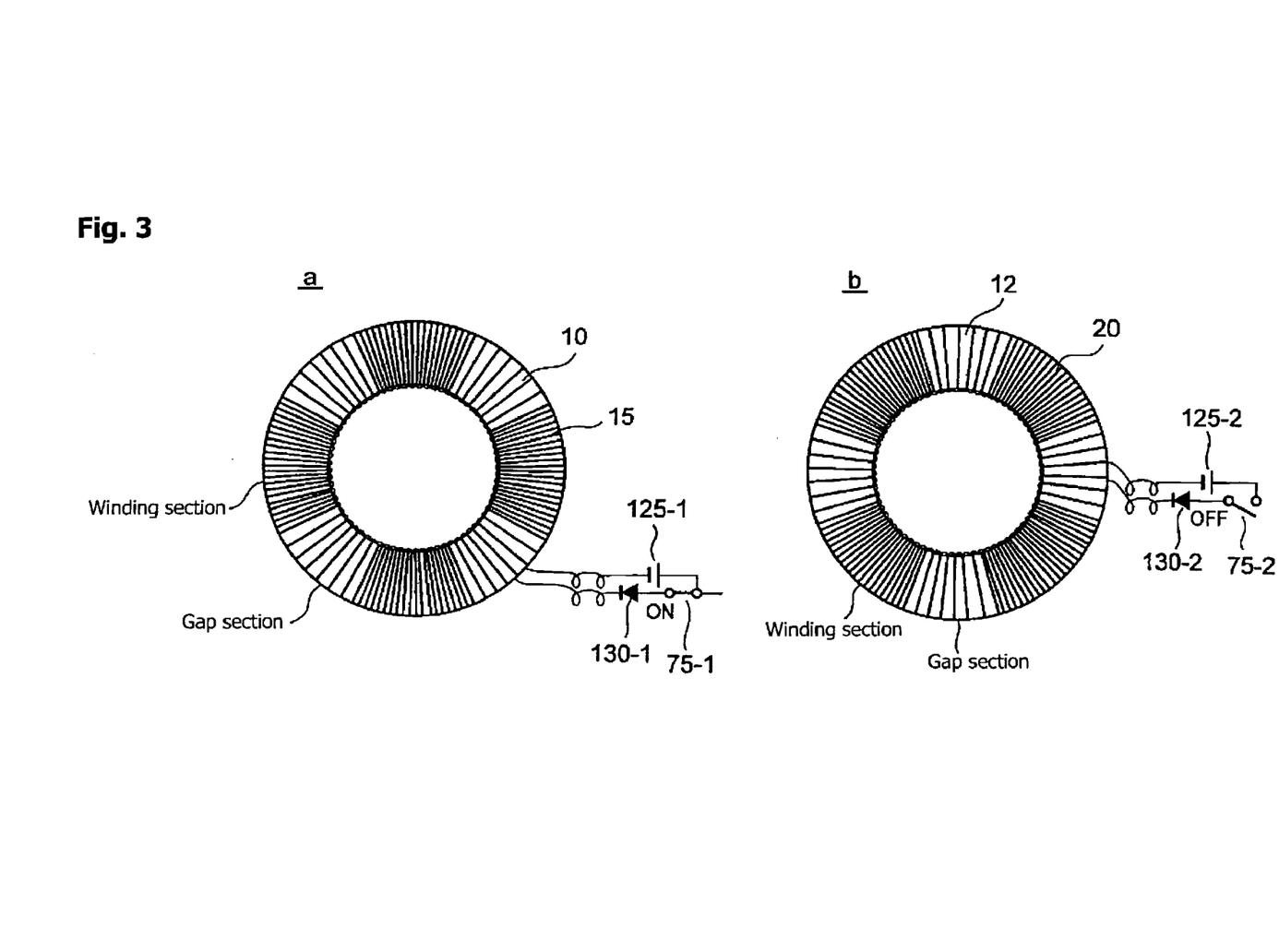
FIGS. 3a and 3b are connection circuit diagrams showing the connection constitution of switching windings of the present invention.

FIG. 3 is a circuit connection diagram showing the connection of switching windings of the present invention. In FIG. 3a, the first switching winding 15 having four winding sections and gap sections is wound around the first ring core 10. The both ends of the first switching winding 15 are connected to the first power supply 125-1, the first switch 75-1 and the reverse current prevention diode 130-1 in series, thereby constituting a closed circuit.

In FIG. 3b, the second switching winding 20 having four winding sections and gap sections is wound around the second ring core 12. The gap parts and the winding parts of the first and second switching windings 15 and 20 are opposite each other. The both ends of the second switching winding 20 are connected to the second power supply 125-2, the second switch 75-2 and the reverse current prevention diode 130-2 in series, thereby constituting a closed circuit.

Figure 4:
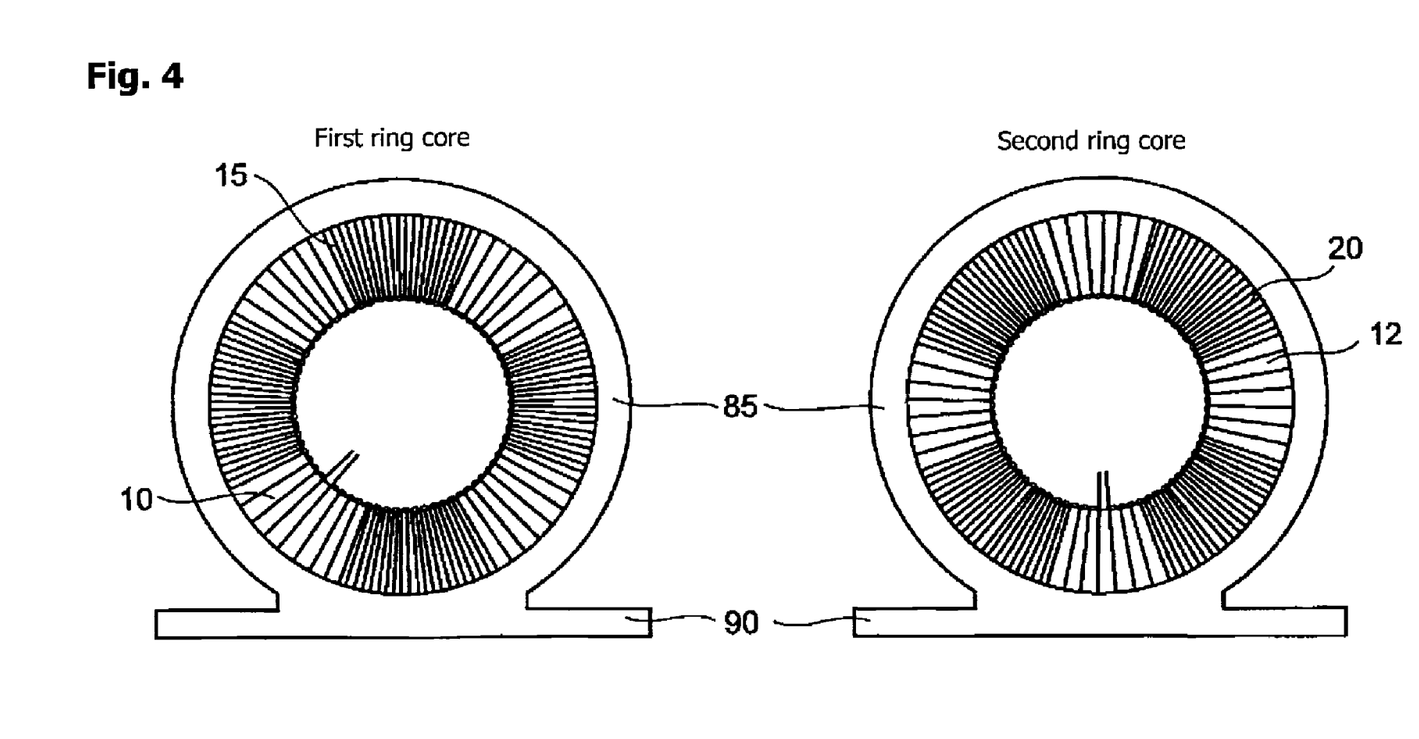
FIG. 4 is an assembly diagram showing the assembly constitution of ring cores and stator cover of the present invention.

FIG. 4 is an assembly diagram showing the assembly constitution of a ring core and a stator cover of the present invention. The first ring core 10 and the second ring core 12 are placed opposite to each other relative to the stator 55 (not shown) and fixed to the stator cover 85 which is fixed on the base 90.

Figure 5:
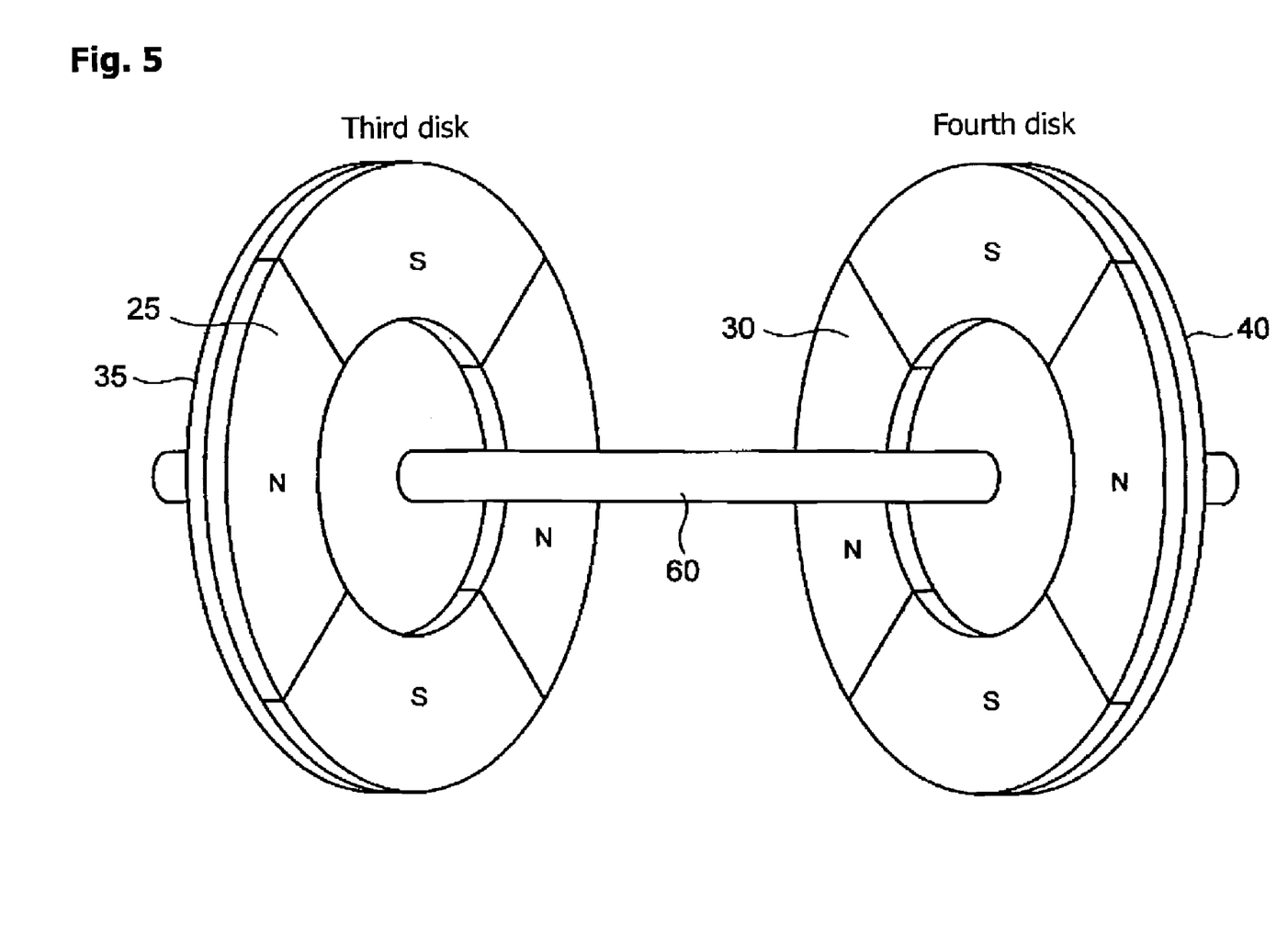
FIG. 5 is a rotor constitutional diagram showing the constitution of rotors of the present invention.

FIG. 5 is a rotor constitutional diagram showing the constitution of rotor of the present invention. In FIG. 5, the first rotor plate 35 comprising the third disk 25 having four magnets and the second rotor plate 40 comprising the fourth disk 30 having four magnets are connected with each other by the driving shaft 60 and placed opposite to each other relative to the first ring core 10 and the second ring core 12 shown in FIG. 4, respectively. The third disk 25 and the fourth disk 30 are disposed in such a manner that the same poles of each of the magnets are opposing each other. The driving shaft 60 is supported by the bearings 65 and 70 and fixed on the base 90 by the stator cover 85 as shown in FIG. 1.

Figure 6:
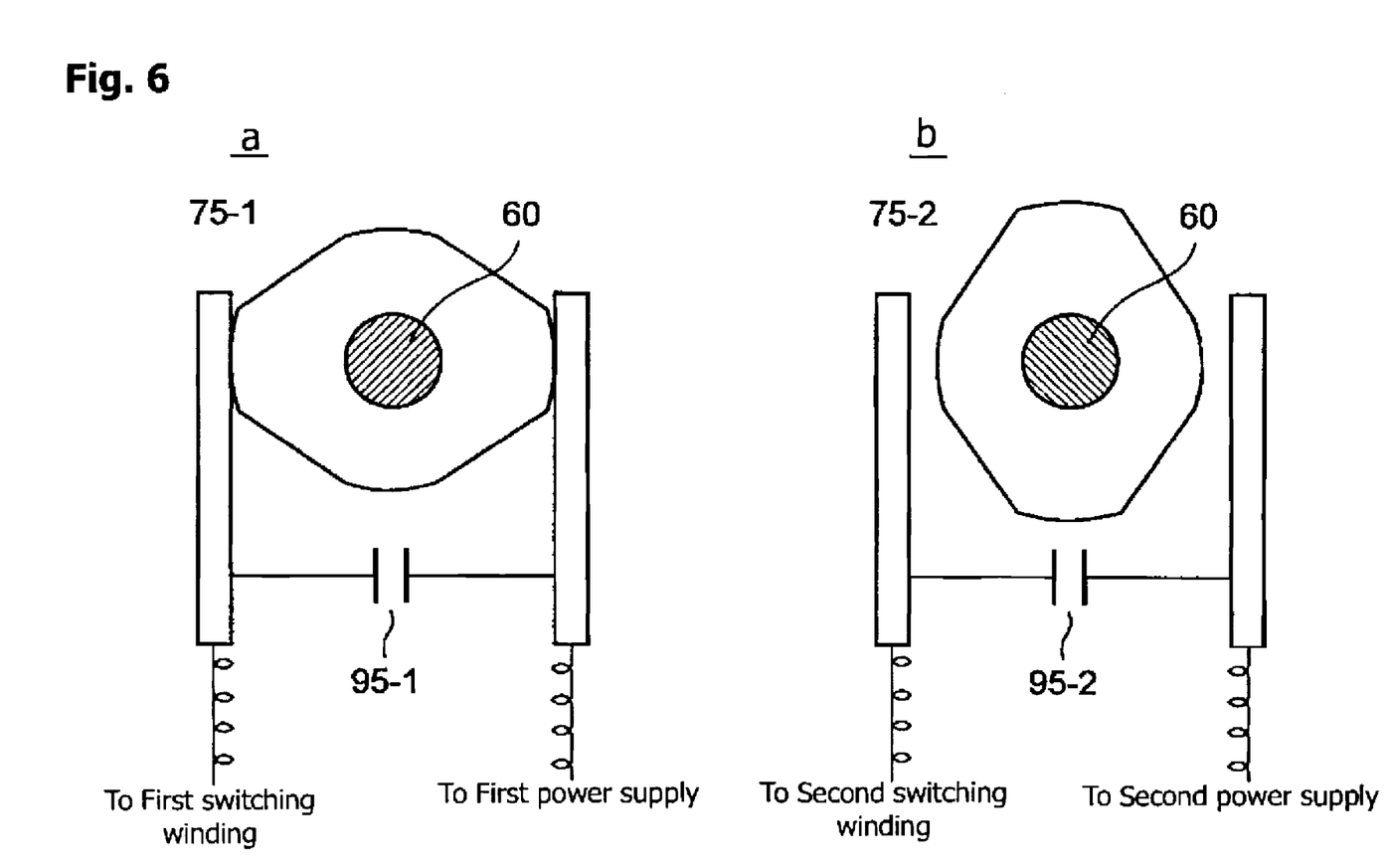
FIGS. 6a and 6b are connection diagrams showing the connection between rotary switches and a driving shaft.

FIGS. 6a and 6b are connection diagrams showing the connection between rotary switches and a driving shaft. In FIGS. 6a and 6b, the first switch 75-1 and the second switch 75-2 are rotary switches and connected to the driving shaft 60. Each of the rotary switches functions as the first switch 75-1 and the second switch 75-2. As shown in FIGS. 3a and 3b, the first switch 75-1 is connected to the first power supply 125-1 and the reverse current prevention diode 130-1 in series, thereby constituting a closed circuit with the first switching winding 15. In the same manner, the second switch 75-2 is connected to the second power supply 125-2 and the reverse current prevention diode 130-2 in series, thereby constituting a closed circuit with the second switching winding 20. Spark absorbing capacitors 95-1 and 95-2 for absorbing sparks generated on the rotary switches are connected between the terminals of the rotary switches, respectively. The rotary switches are turned on/off in accordance with the rotation angle of the driving shaft 60.

Figure 7:
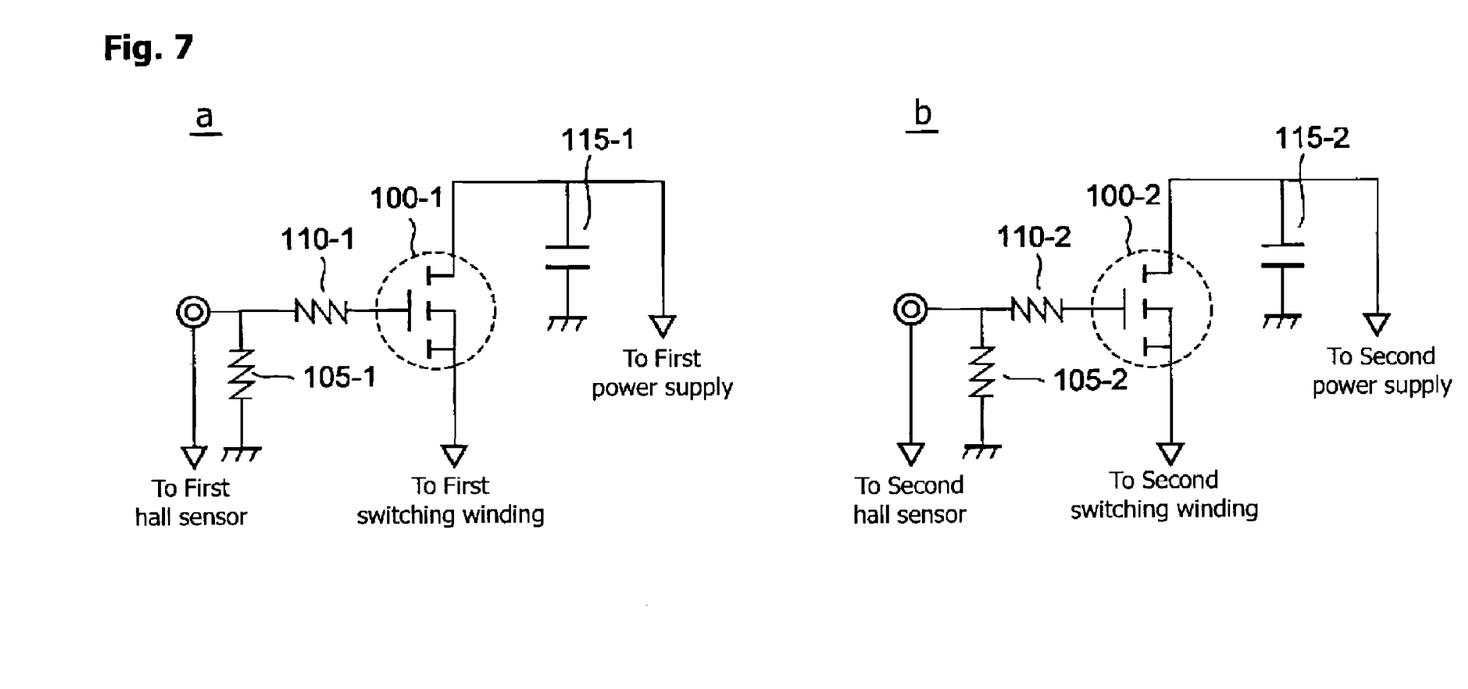
FIGS. 7a and 7b are circuit connection diagrams of electronic switches.

FIGS. 7a and 7b are circuit connection wiring diagrams of the electronic switches. The rotary switches of FIG. 6, mechanical switches, can be replaced with electronic switches, power MOSs 100-1 and 100-2, respectively. In FIGS. 7a and 7b, the first and second hall sensors (not shown) detect the rotation angle of the first and second rotors 35 and 40 shown in FIG. 5, and detection signals are input to the gates of the power MOSs 100-1 and 100-2, respectively through resistors 110-1 and 110-2 so that the power MOSs 100-1 and 100-2 function as switching elements. Resistors 105-1 and 105-2 generate bias voltages to the gates. The power MOSs 100-1 and 100-2 are connected to the first power supply 125-1 and the second power supply 125-2, and the reverse current prevention diodes 130-1 and 130-2, respectively in series, thereby constituting closed circuits with the first switching winding 15 and the second switching winding 20. The spark absorbing capacitors 115-1 and 115-2 are connected between the ends of the power MOSs 100-1 and 100-2 and the ground.

Before the explanation of the operation of the electric motor 200 in FIG. 1, there is explained a case where the first rotor plate 35, the second rotor plate 40 and stator 55 have each of independent driving shafts in preserving the positional relations for respective permanent magnets as shown in FIG. 1. In this constitution, when the first rotor plate 35 is rotated for example manually under the condition that no current is applied to the first switching winding 15 of the first ring core 10, the stator 55 remains at rest. However, when the first rotor plate 35 is rotated under the condition that current is applied to the first switching winding 15, the opposite poles of the third disk 25 and the first disk 45 are attracted and the stator 55 starts to rotate following the rotation of the first rotor plate 35. Thus, the interaction due to the magnetic field of the first rotor plate 35 and the stator 55 can be controlled by current of the switching winding 15.

Also, when the second rotor plate 40 is rotated under the condition that no current is applied to the second switching winding 20 of the first ring core 12, the stator 55 remains at rest. On the other hand, under the condition that either the second rotor plate 40 or the stator 55 is stopped and current is applied to the second switching winding 20, the opposite balance between the fourth disk 30 and the second disk 50 which are faced with each other is slightly lost and, by each other's attraction repulsion force, either the second rotor plate 40 or the stator 55 which is not stopped starts to rotate. Similarly in this case, the interaction due to the magnetic field of the second rotor plate 40 and the stator 55 can be controlled by current of the switching winding 20.

According to the above rotation control operation, a rotation operation in the constitution of the FIG. 1 is now explained. Under the condition that current is applied to the second switching winding 20, the opposite balance between the fourth disk 30 and the second disk 50 which are faced with each other is slightly lost and, by each other's attraction repulsion force, second rotor plate 40 starts to rotate. In this case, current to the first switching winding 15 is interrupted to prevent the opposite poles of the opposite third disk 25 of the first rotor plate 35 and the first disk 45 of the stator 55 from being attracted each other, which becomes braking power to rotation.

By this rotation, the positional relation between the third disk 25 of the first rotor plate 35 and the first disk 45 of the stator 55, and that of the fourth disk 30 of the second rotor plate 40 and the second disk 50 of the stator 55, are switched. If current is applied to the first switching winding 15 in this condition, when the opposite balance between the fourth disk 30 and the second disk 50 which are opposite is slightly lost, and, by each other's attraction repulsion force, the first rotor plate 35 operates to maintain the rotation of the driving shaft 60. Similarly in this case, current to the second switching winding 20 is interrupted to prevent the opposite poles of the opposite fourth disk 30 of the second rotor plate 40 and the second disk 50 of the stator 55 from being attracted each other, which becomes braking force to rotation.

In this way, the electric motor 200 maintains rotation by switching and controlling the current supply to the first switching winding 15 and the second switching winding 20 by the first switch 75-1 and second switch 75-2. As explained in FIGS. 6 and 7, this current switch control of the first switch 75-1 and the second switch 75-2 can be turned on/off according to the rotation angle of the driving shaft 60 by a rotary switch of mechanical switch or can be replaced with electronic switches, power MOSs 100-1 and 100-2 respectively.

Also, the direction of the current supplied to the first switching winding 15 and the second switching winding 20 is not limited according to a rotation direction. The magnitude of a rotational torque is determined by a magnetic field strength of each permanent magnet and current of the switching winding may be small current only to control the interaction due to this magnetic field. Therefore, as shown in FIG. 3, the first and second switching windings 15 and 20 each having four winding sections and gap sections are wound around the first and second ring cores 10 and 12 in such a manner the winding sections and gap sections are opposite. The both ends of the first and second switching windings 15 and 20 are connected with the first and second power supplies 125-1 and 125-2, the first and second switches 75-1 and 75-2 and the reverse current prevention diodes 130-1 and 130-2 in series, constituting a closed circuit.

In this constitution, due to the rotation of the first rotor plate 35 and second rotor plate 40, magnetic paths formed respectively on the third disk 25 and the fourth disk 30 pass through the winding parts of the first switching winding 15 and the second switching winding 20, and then induced electromotive forces are generated on the each winding part. By combining and applying each current due to the induced electromotive forces and the current due to the first and second power supplies 125-1 and 125-2, the current of the switching windings from each power supply can be further decreased.

If the current direction of the electromotive force induced on the winding parts of the first switching winding 15 and the second switching winding 20 is different from that of the current of the switching winding supplied from each power supply, the current of the switching windings is prevented by the reverse current prevention diodes 130-1 and 130-2. The diodes can be omitted by synchronizing the timing when this opposite direction current flows out with the timing when the switch turns off the current of the switching windings to maintain rotation.

Also, to maintain the initial direction of rotation constant, a small motor for start can be provided, and two electric motors of the present invention can be directly connected by coupling etc. and started from a rest state by slightly offsetting the alignment angles of the magnet pieces of each rotor. Further, by controlling the current switch timing of the first switch 75-1 and the second switch 75-2, rotation speed and driving force can be controlled and rotation direction can also be controlled.

As explained above, since the magnitude of a rotational torque is determined by strength of a magnetic field of each permanent magnet and the current of the switching winding for controlling the interaction due to the magnetic field may be small current, an electric motor needs less electricity. Also, by utilizing the current of the electromotive forces induced on the switching windings, the current supply from the power supplies can be even smaller. Stators and rotors can easily be arranged on the same driving shaft at predetermined spacings, therefore advanced design and production technologies are not required. Thus there can be provided a simple electric motor operable with small electricity.

DESCRIPTION OF REFERENCE NUMERALS

10: first ring core
12: second ring core
15: first switching winding
20: second switching winding
25: third disk
30: fourth disk
35: first rotor plate
40: second rotor plate
45: first disk
50: second disk
55: stator plate
60: driving shaft
65: first bearing
70: second bearing
75-1, 2: switches
85: stator cover
90: base
95-1, 2: spark absorbing capacitors
100-1, 2: power MOSs
105-1, 2: resistors
110-1, 2: resistors
125-1: first power supply
125-2: second power supply
130-1, 130-2: reverse current prevention diodes
200: electric motor

The invention claimed is:

1. An electric motor comprising:
a stator plate having a plurality of permanent magnet pieces on a first surface thereof to form a first disk and a same number of permanent magnet pieces on a second surface thereof to form a second disk; the first disk and the second disk being constructed in such a manner that two magnet pieces adjacent with each other are aligned to have opposite magnetic poles; the first disk and the second disk facing with each other in such a manner that two corresponding magnet pieces are faced with each other to have opposite magnetic poles;
a first ring core having a first switching winding disposed and fixed on a side of the first disk; the first switching winding being dividedly wound around the first ring core to form a plurality of winding sections and a same number of gap sections;
a second ring core having a second switching winding disposed and fixed on a side of the second disk; the second switching winding being dividedly wound around the second ring core to form a plurality of winding sections and a same number of gap sections;
the numbers of the winding sections and the gap sections being the same as the number of the permanent magnet pieces on the first disk or the second disk;
a first rotor plate having the same number of permanent magnet pieces as that of the first disk on one surface thereof to form a third disk in such a manner that two magnet pieces adjacent with each other are aligned to have opposite magnetic poles and rotatably facing relative to the first switching winding;
a second rotor plate having the same number of permanent magnet pieces as that of the first rotor plate on one surface thereof to form a fourth disk in such a manner that two magnet pieces adjacent with each other are aligned to have opposite magnetic poles and rotatably facing relative to the second switching winding;
the first rotor plate and the second rotor plate being securely coupled by a driving shaft; the third disk and the fourth disk facing with each other in such a manner that two corresponding magnet pieces are faced with each other to have same magnetic poles;

a first power supply means for intermittently supplying current through a first switch to the first switching winding; and a second power supply means for intermittently supplying current through a second switch to the second switching winding, wherein the first power supply means supplies current to the first switching winding and the second power supply means stops current to the second switching winding when the third disk rotatably faces relative to the first disk in such a manner that two corresponding magnet pieces are faced with each other to have same magnetic poles, and wherein the second power supply means supplies current to the second switching winding and the first power supply means stops current to the first switching winding when the fourth disk rotatably faces relative to the second disk in such a manner that two corresponding magnet pieces are faced with each other to have same magnetic poles, thereby controlling rotation of the first rotor plate and the second rotor plate.

2. The electric motor according to claim 1, wherein the first switching winding is wound in such a manner that each center of the winding sections is aligned with each of contact parts at which the magnet pieces of the first disk are in contact with each other and the second switching winding is wound in such a manner that each center of the winding sections is aligned with each of contact parts at which the magnet pieces of the second disk are in contact with each other.

* * * * *